Feb. 24, 1953     K. B. MAXWELL     2,629,344
PORTABLE FROZEN CONFECTION DISPENSER
Filed May 4, 1950

Keaton Bruce Maxwell
INVENTOR.

Patented Feb. 24, 1953

2,629,344

UNITED STATES PATENT OFFICE 2,629,344

PORTABLE FROZEN CONFECTION DISPENSER

Keaton Bruce Maxwell, Kansas City, Mo.

Application May 4, 1950, Serial No. 160,062

4 Claims. (Cl. 107—48)

This invention appertains to a portable apparatus for dispensing scoops or portions of a frozen confection from a container.

The primary object of the instant invention is to automatically loosen up and extract a portion of a frozen confection from a container by means of a rotary scoop.

Another important object of this invention is to provide a power-driven scoop, which will be convenient and efficient in operation regardless of the texture of the frozen confection.

Another object of this invention is to provide a power-driven rotary scoop with automatic ejecting means, the ejecting means including a lever pivotally mounted on the motor and controlling the switch means for the motor.

These and ancillary objects and structural features of merit are attained by this invention, the preferred embodiments of which are set forth in the following description and illustratd in the accompanying drawing, wherein.

Figure 1:
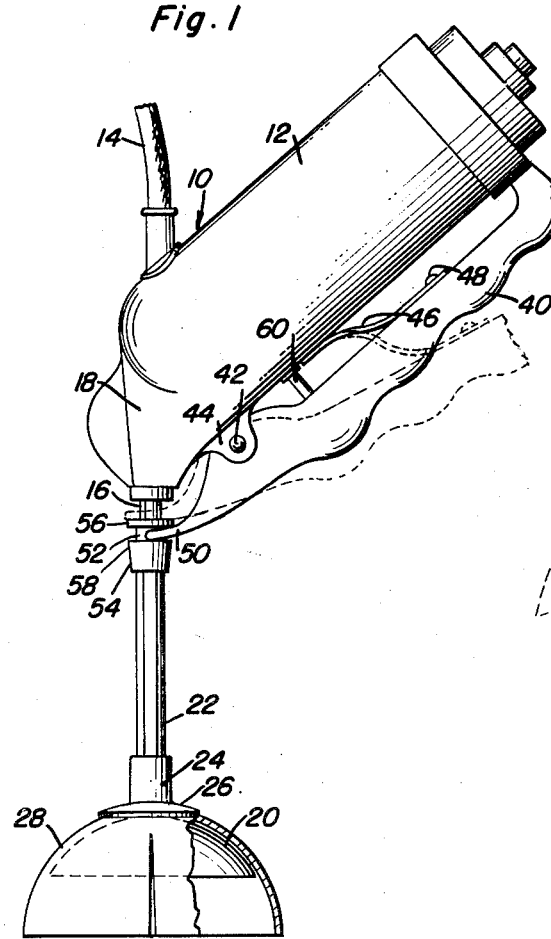
Figure 1 is a side elevational view of the power-driven scoop, with a portion of the scoop being broken away and illustrated in section.
Figure 2:
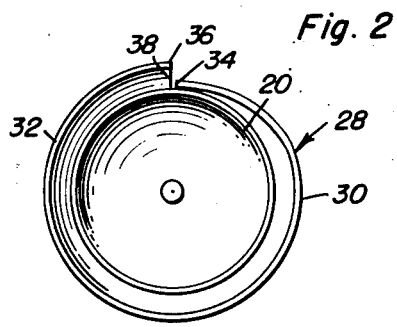
Figure 2 is bottom plan view of the scoop.

Attention is first directed to Figures 1 and 2, wherein the power-driven scoop 10 includes a small portable electric motor 12 provided with an electric conductor 14, which may be secured in any suitable electric outlet. A polygonal drive shaft 16, which may be square or hexagonal, projects outwardly from the lower portion of the front end 18 of the motor and scoop discharging means in the form of a concavo-convex plate or cup 20 is fixed to the outer terminal thereof. A tubular, polygonal shaft 22 is slidably disposed on the drive shaft 16 for rotation therewith. A sleeve 24 is associated with the lower end of the tubular shaft 22 and terminates in a saddle portion 26 secured to the closed end of a semi-circular scoop 28. The scoop 28 encompasses the cup 20 and is formed with opposed side walls 30 and 32, the side walls being connected at one of their ends and being formed with free ends 34 and 36, the end 34 terminating inwardly of the end 36 so that the end 36 extends outwardly to form a scooping blade or lip. The two ends 34 and 36 define an opening 38, so that as the scoop is rotated by the drive shaft 16, the lip or blade end 36 will dig into and loosen up the frozen confection, the loosened confection being forced into the scoop for extraction from the container.

A lever 40 is pivotally secured by a pivot pin 42 to a pair of lateral ears 44 projecting from the undersurface of the motor housing. A leaf spring 46 is riveted, as at 48, to the lever and abuts against the housing. The outer end of the lever is bifurcated and the bifurcated end is held in a circular recess 52 of an enlargement 54 on the upper end of the tubular shaft by means of complementary shoulders 56 and 58 formed on the enlargement and defining the recess.

Thus, by grasping the motor and moving the lever 40 inwardly against the opposition of the leaf spring, switch means 60 controlling the motor is actuated to rotate the drive shaft. At the same time, the tubular shaft is urged downwardly on the drive shaft so that the scoop is moved downwardly onto the cup 20. The scoop is then positioned in the confection and a portion thereof is packed into the scoop upon rotation of the scoop. To eject the portion of confection from the scoop, the lever 40 is released, whereupon the tubular shaft is urged upwardly on the drive shaft and the scoop is moved away from the cup, causing the extracted portion of confection to drop from the scoop.

Figure 3:
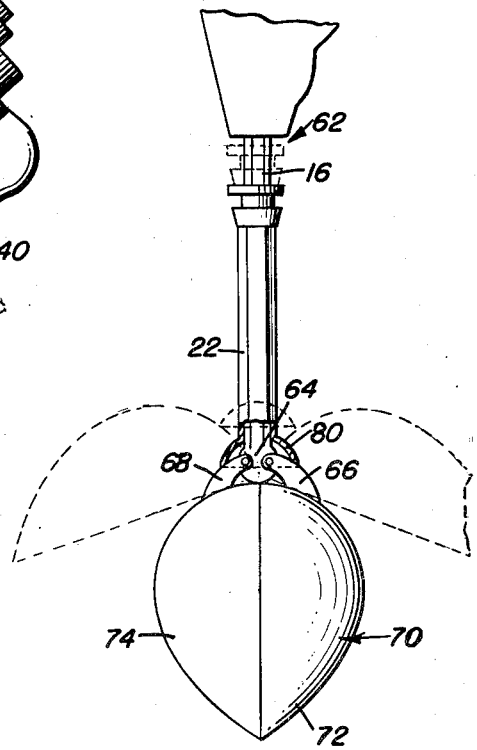
Figure 3 is a fragmentary front elevational view of another embodiment.
Figure 4:
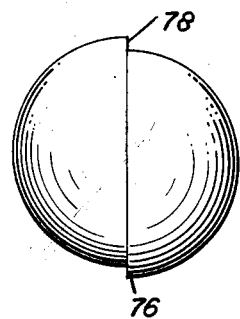
Figure 4 is a bottom plan view of the scoop.

As seen in Figures 3 and 4, another embodiment 62 is illustrated. In this respect, the motor, lever actuator and shaft arrangement is similar but, the lower end of the drive shaft 16 terminates in an enlargement 64 to which a pair of arms 66 and 68 are pivoted. The arms support a sectional ovoid scoop 70, which includes a pair of complementary cooperable scoop sections or segments 72 and 74, the sections being arranged so that their opposing ends 76 and 78 project outwardly, as seen in Figure 4, to provide openings and blades, whereby the confection may be forced into the scoop.

The lower end of the outer tubular shaft 22 is swaged as at 80 and bears against the arms, so that as the tubular shaft is forced downwardly by the inward movement of the lever, actuating the motor switch, the sections of the scoop are brought together. Release of the lever permits the arms to swing apart and the extracted portion of confection is released from the scoop.

Having described the invention, what is claimed as new is:

1. In a dispenser of the character described, the combination of an electric motor including a housing, a depressible switch button and a drive shaft projecting outwardly from said housing, a rotary scoop unit carried by said drive shaft and including means for discharging contents thereof, a sleeve slidable on said shaft and operatively connected to said scoop unit for actuating the discharging means, and a control lever movably attached to said housing, said lever abutting said button and being operatively connected to said sleeve whereby the discharging means and said switch may be simultaneously actuated by said lever.

2. The device as defined in claim 1 wherein said sleeve is rotatable with said shaft and is provided with an annular groove, said lever having a forked end operatively engaging said groove.

3. In a dispenser of the character described, the combination of an electric motor including a housing, a depressible switch button and a drive shaft of a polygonal cross-section projecting outwardly from said housing, a sleeve of a polygonal cross-section slidable on and rotatable with said drive shaft, a rotary scoop unit comprising an inverted substantially hemispherical scoop secured to said sleeve, said scoop being provided with a radial slit and a portion of the scoop at one edge of the slit being offset outwardly to provide a cutting blade, an inverted cup secured to said shaft and disposed in said scoop, a control lever movably attached to said housing, said lever abutting said button, and means operatively connecting said lever to said sleeve for sliding the latter on said shaft, whereby said switch may be actuated and said scoop simultaneously shifted relative to said cup to discharge contents of the scoop.

4. In a dispenser of the character described, the combination of an electric motor including a housing, a depressible switch button and a drive shaft projecting outwardly from said housing, a sleeve slidable on and rotatable with said drive shaft, a rotary scoop unit comprising a pair of half-sections pivoted to said shaft, said half-sections being laterally offset from each other whereby edges thereof afford a pair of cutter blades, an inverted cup provided on said sleeve and engaging said half-sections to sustain the scoop unit in a closed position, a control lever movably attached to said housing, said lever abutting said button, and means operatively connecting said lever to said sleeve for sliding the sleeve on said shaft, whereby said switch may be actuated and said cup simultaneously shifted relative to the scoop unit to discharge contents of the latter.

KEATON BRUCE MAXWELL.

REFERENCES CITED

The following references are of record in the file of this patent:

UNITED STATES PATENTS

| Number | Name | Date |
|---|---|---|
| 2,201,403 | Knaust | May 21, 1940 |